United States Patent [19]

Lenhardt

[11] Patent Number: 5,027,941
[45] Date of Patent: Jul. 2, 1991

[54] APPARATUS FOR CONVEYING GLASS PLATES STANDING ON EDGE

[75] Inventor: Karl Lenhardt, Neuhausen-Hamberg, Fed. Rep. of Germany

[73] Assignee: Lenhardt Maschinenbau GmbH, Hamburg, Fed. Rep. of Germany

[21] Appl. No.: 517,425

[22] Filed: May 1, 1990

Related U.S. Application Data

[63] Continuation of Ser. No. 211,141, Jun. 22, 1988, abandoned, which is a continuation-in-part of Ser. No. 918,364, Oct. 14, 1986, abandoned.

[30] Foreign Application Priority Data

Oct. 16, 1985 [DE] Fed. Rep. of Germany ....... 3536846

[51] Int. Cl.$^5$ .......................................... B65G 19/30
[52] U.S. Cl. ................................ 198/721; 198/836.3; 65/104
[58] Field of Search ............ 198/836, 780, 721, 836.3; 406/86, 88; 414/676; 65/104, 350, 351; 104/23.21, 134

[56] References Cited

U.S. PATENT DOCUMENTS

| | | | |
|---|---|---|---|
| 3,346,360 | 10/1967 | O'Connell et al. | 65/104 |
| 3,362,806 | 1/1968 | Brewin et al. | 65/350 |
| 3,485,616 | 12/1969 | Nitschke | 198/721 |
| 3,630,706 | 12/1971 | Oelke | 65/104 |
| 3,734,567 | 5/1973 | Fong | 406/86 |
| 4,010,981 | 3/1977 | Hodge | 406/88 |

FOREIGN PATENT DOCUMENTS

| | | |
|---|---|---|
| 3101342 | 7/1982 | Fed. Rep. of Germany . |
| 3232451 | 12/1983 | Fed. Rep. of Germany . |
| 3308079 | 9/1984 | Fed. Rep. of Germany . |

Primary Examiner—H. Grant Skaggs
Assistant Examiner—Cheryl L. Gastineau
Attorney, Agent, or Firm—Dvorak and Traub

[57] ABSTRACT

The apparatus comprises a bottom edge supporting conveyor and an inclined planar supporting wall. The supporting wall is formed along its bottom edge with a plurality of air exit slots, which are arranged in a row and receive air from a fan. Additional air exit openings are spaced a substantial distance above the slots and together with the slots produce an air cushion, on which glass plates can slide along the supporting wall without contacting the latter.

12 Claims, 4 Drawing Sheets

APPARATUS FOR CONVEYING GLASS PLATES STANDING ON EDGE

This application is a continuation of application Ser. No. 211,141, filed June 22, 1988, now abandoned which is a continuation in part of U.S. Ser. No. 918,364, filed Oct. 14, 1986, now abandoned.

BACKGROUND OF THE INVENTION

1. Field of the Invention

This invention relates to apparatus for horizontally conveying glass plates standing on edge, comprising a bottom edge supporting conveyor having a plane of conveyance which is horizontal or is slightly inclined from the horizontal, and a supporting wall, which is disposed above said conveyor and serves to laterally support glass plates standing on said conveyor, which supporting wall is slightly inclined from the vertical and includes a right angle or an angle of approximately 90° with the plane of conveyance, wherein a fan for producing an air cushion is provided on the planar front surface of the supporting wall and on its delivery side communicates through one or more ducts with one or more upwardly directed slot-shaped exit openings, which extends or extend along the lower edge of the supporting wall.

2. Description of the Prior Art

Apparatus of the kind described hereinbefore are known in the art, e.g., from DE 33 08 079 C2. They are used, e.g., in production lines for making insulating glass consisting of two or more glass plates. Such production lines consist, as a rule, of a glass plate washing machine, which is succeeded by a checking station for checking whether the glass plates are clean, by a frame-applying station for applying spacer frames to individual glass plates, by an assembling station, in which the glass plates are superimposed, with a spacer interposed, and are adhesively joined, optionally by a press for pressing plates which have thus been assembled, also optionally by a sealing station, in which a gap formed at the edge of the insulating glass pane is sealed by means of a sealant consisting of a viscous paste, and finally by a taking station, in which the complete insulating glass panes are taken from the production line. As the glass plates move through all said stations, they stand on edge on a bottom edge supporting conveyor, which in most cases consists of a horizontal series of driven rollers having horizontal or approximately horizontal axes, or of a horizontally extending, supported endless conveyor belt, or of a horizontally extending conveyor chain provided with supports for the glass plates standing on edge, or of a pair of conveyor chains for engaging and gripping the individual glass plates of the insulating glass pane at the lower edge of said plates on both sides and for optionally supporting them at their lower edges by suitable supports. In the present description the horizontal or approximately horizontal plane on which the individual glass plates or insulating glass panes stand on edge is described as a plane of conveyance. As the glass plates standing on edge pass through said stations, the glass plates are slightly inclined from the vertical, in most cases at an angle of 5 to 7 degrees, and lean against a supporting structure so that they cannot fall down. Intermediate conveyor sections and retaining conveyor sections are disposed between said stations and each of said conveyor sections is also provided with a bottom edge supporting conveyor and with a lateral support. The supporting structure is often an air cushion wall.

The air cushion walls usually consist of a coated board of wood, which is formed with air exit openings, which are distributed over the forward surface of the board and regularly spaced apart and consist of through bores which extend at right angles to said forward surface. In the known air cushion walls the rear side of the plate of wood is covered by a box, which together with the wooden board constitutes a closed housing, which via a supply duct receives air from a blower and delivers said air through the bores in the plate of wood so that a glass plate leaning against the board of wood will be slightly disengaged from said board and will cause an air cushion to be formed between the glass plate and the board so that the glass plate is laterally supported on the board without contacting it.

In that connection it is also known to provide in the board near its lower edge a linear series of air exit openings which are spaced a smaller distance apart than adjacent air exit openings in the remaining area of the board.

DE 33 08 079 C2 discloses an air cushion wall, which is not provided in its forward surface with air exit openings but in which a slot nozzle having upwardly facing exit orifices extends along the lower edge of the wall and through said orifices delivers air from the fan into the space between the supporting wall and a glass plate leaning against the wall.

Apparatus for conveying glass panes should be suitable for handling plates of all sizes used in practice. The sizes of the plates used in practice vary in a wide range, and the plates may have edge lengths from about 20 cm to about 3 m. In the operation of the previously known glass plate conveying apparatus comprising an air cushion wall it is difficult to ensure that large and heavy glass plates as well as small and lightweight glass plates will be conveyed with equal effectiveness and reliability. In those of the known apparatus in which the air cushion walls which are optimized for the conveyance of heavy plates, there is a risk that the air blasts directed against lightweight plates will be so strong so that such plates will be tilted from the supporting wall. On the other hand, in those of the known apparatus in which the air cushion wall is optimized for the conveyance of lightweight plates, there will be a risk that heavy plates will not be disengaged from the supporting wall but will move in contact with said wall.

SUMMARY OF THE INVENTION

It is an object of the invention so to improve an apparatus of the kind described first hereinbefore that small and lightweight glass plates as well as large and heavy glass plates can reliably be conveyed without difficulty while they are laterally supported by an air cushion formed by a fan and without a need to change the delivery rate of the fan.

This object is accomplished in that the exit openings consist of slots, which are formed in the supporting wall and are forwardly and upwardly inclined.

Further improvements proposed by the invention are recited in the dependent claims.

It has surprisingly been found that the object set forth can be accomplished by the provision of exit openings which consist of slots, which are formed in the wall along the lower edge thereof and are forwardly and upwardly inclined, particularly if said supporting wall is additionally formed with conventional air exit openings, provided that the latter are not too close to the slots provided in accordance with the invention but are distributed in the supporting wall and spaced from said slots at least 80 cm and preferably at least 100 to 120 cm. When the glass plates being conveyed are small and light in weight, the air flowing out of the slots will generate a subatmospheric pressure between the supporting wall and the glass plate and that subatmospheric pressure will be sufficient to reliably prevent a tilting of the glass plates from the supporting wall. When the glass plates being conveyed are heavy so that otherwise there would be a risk that they may not be disengaged from the supporting wall but may move in contact with the same, the arrangement of the novel air exit slots will ensure that the air cushion will be stabilized so that it cannot collapse as easily as in the known apparatus even under the pressure applied by heavy glass plates. The ability of the air cushion to support heavy glass plates can be increased by the provision of additional air exit openings in the upper portion of the supporting wall. Such additional air exit openings should have such an elevation that they will blow air against large and heavy plates but will not blow air against small, lightweight glass plates, which might be tilted from the supporting wall.

To ensure that the slots formed in the supporting wall can perfectly accomplish their intended purpose, such slots should extend substantially throughout the length of the supporting wall. The result to be produced in accordance with the invention might be obtained with a single, continuous slot. But it is simpler for structural reasons to provide the supporting wall with a series of slots.

The distance from the slots to the bottom edge of the supporting wall will mainly depend on the sizes of the plates to be conveyed by the apparatus. If it is desired to convey plates having an edge length of 20 cm or more, as is often the case in practice, the slots can be spaced only a correspondingly small distance of preferably between 5 and 10 cm above the bottom edge of the supporting wall. If the supporting wall is so arranged that its lower edge is spaced about 10 cm above the plane of conveyance—as is also the case in the known apparatus—a satisfactory conveyance of plates having an edge length of 20 cm will be ensured if the slots are spaced 5 to 10 cm above the lower edge of the supporting wall.

In order to produce the desired upward flow between the supporting wall and the glass plate being conveyed, the air exit slots formed in the supporting wall suitably extend at an angle between 40 and 60 degrees, preferably at an angle of 45 degrees, to the forward surface of the supporting wall.

Backing rollers having an axis of rotation which is parallel to the supporting wall and at right angles to the direction of conveyance are preferably provided between the supporting wall and the bottom edge supporting conveyor and have a peripheral surface which slightly protrudes beyond the forward surface of the supporting wall. As a result, an upwardly tapering small air gap is inherently provided between each glass plate and the supporting wall so that the air leaving the slots in the supporting wall can easily be distributed in said gap. Such backing rollers will also ensure that small plates will not be so strongly urged against the supporting wall by the subatmospheric pressure prevailing in the air stream that the movement of such plates would be braked.

The additional air exit openings preferably provided in the upper portion of the supporting wall may simply consist of bores, which extend at right angles to the forward surface of the supporting wall and which direct an air blast against large glass plates being conveyed. In a preferred arrangement, air exit openings provided on eye level in an apparatus standing on the floor, i.e., in a region which is spaced about 1.5 to 1.9 m above the floor, are arranged in a lower row, in which the air exit openings are downwardly and forwardly inclined, and in an upper row, in which the air exit openings are upwardly and forwardly inclined, so that the air leaving said air exit openings when they are not covered by a glass plate will not be blown into the face of operators of the apparatus.

DETAILED DESCRIPTION OF THE PREFERRED EMBODIMENT

Figure 1:
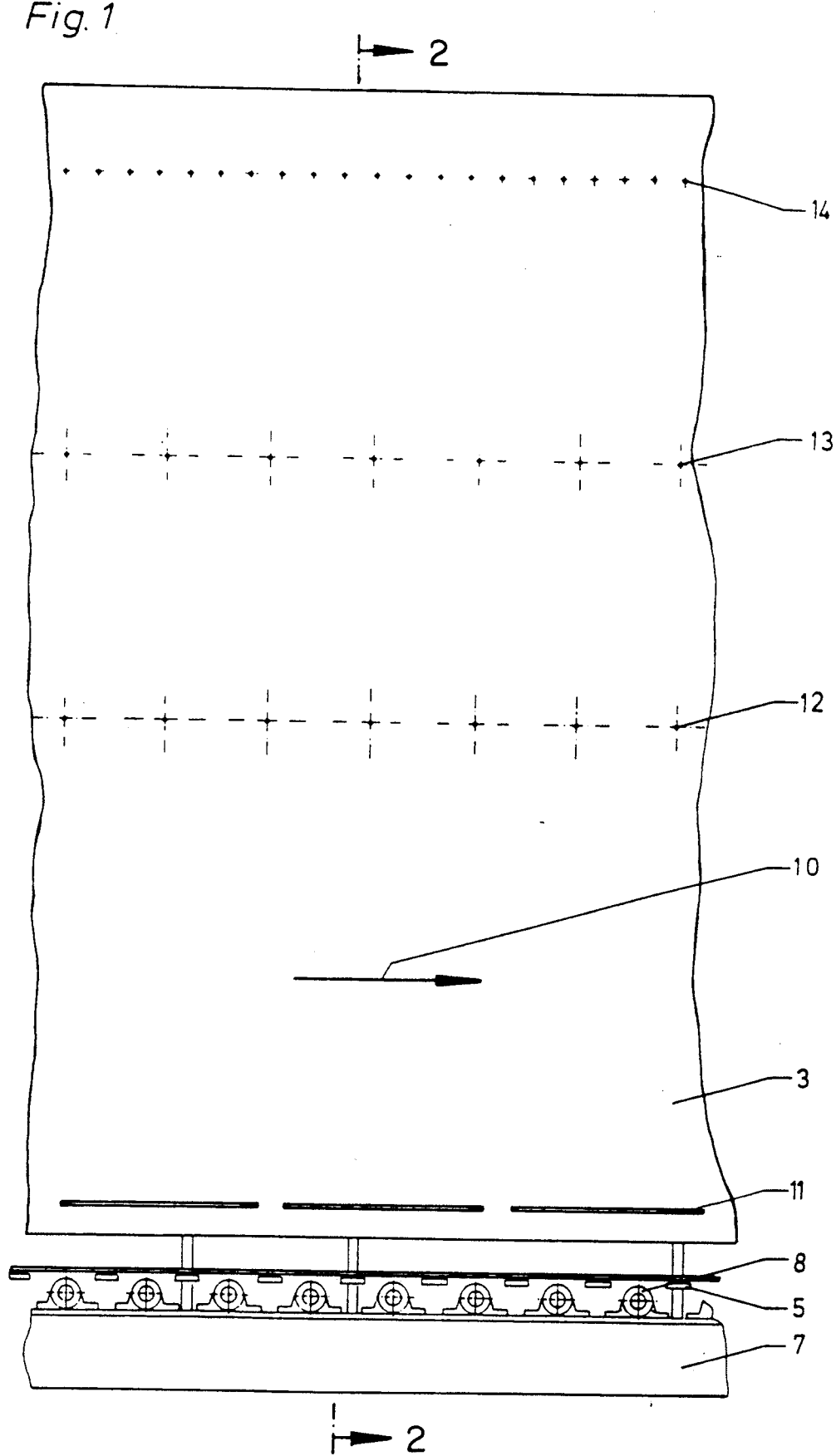
FIG. 1 is a front elevation showing the apparatus.
Figure 2:
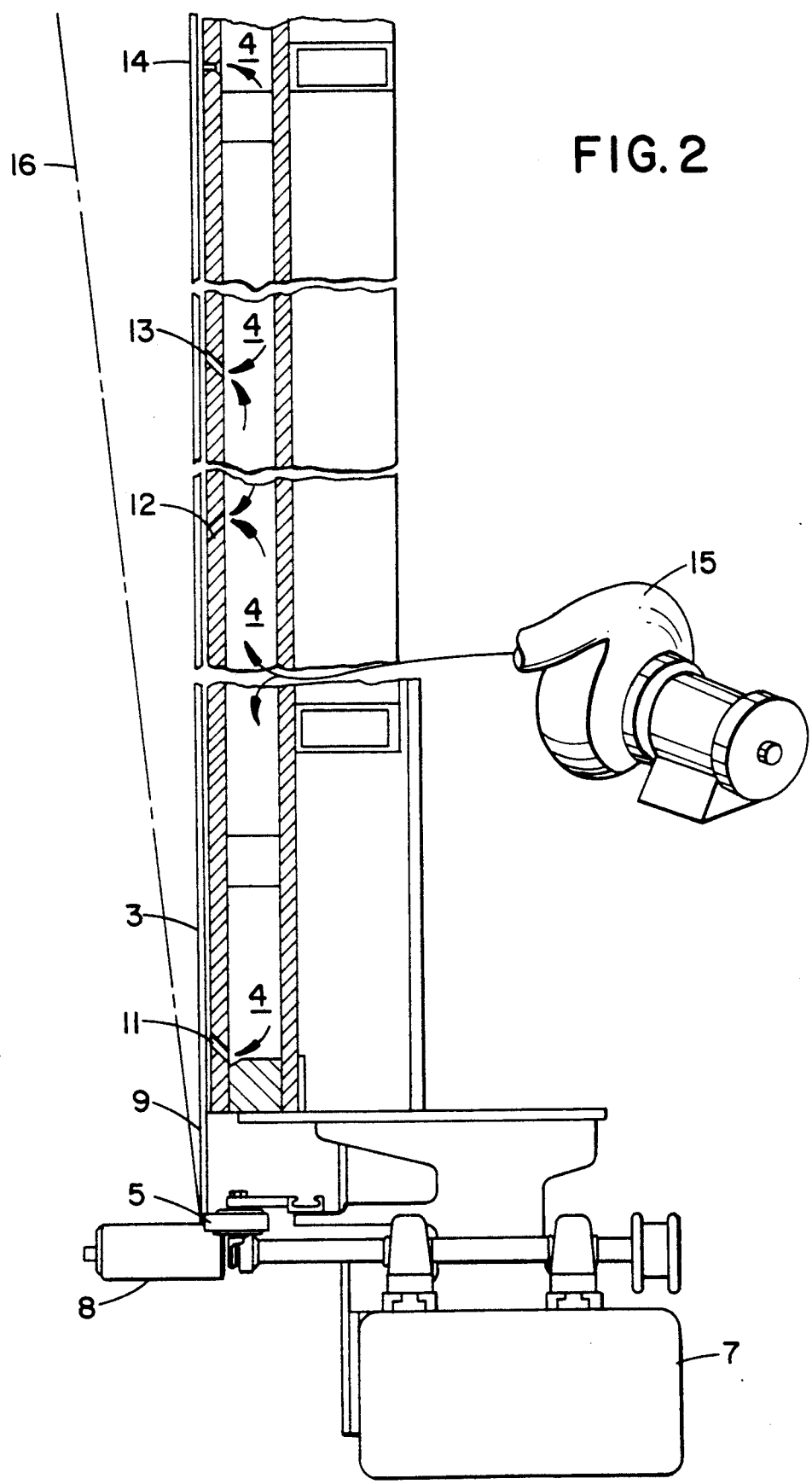
FIG. 2 is an enlarged vertical sectional view taken on line II—II in FIG. 1.

A rectangular, flat supporting wall 2 rests on an underframe and is held in a slightly rearwardly inclined position at an angle of a few degrees from the vertical 16. A carrier 7, which is covered by a housing, is supported on the underframe below the supporting wall 2 and extends throughout the length of the apparatus and carries a series of cylindrical rollers 8, which are adapted to be driven in synchronism to rotate about axes which are disposed on the same level and extend at right angles to the supporting wall 2. The rollers 8 constitute the bottom edge supporting conveyor, which serves to convey the glass plates 9 in a horizontal direction (e.g. in the direction of the arrow 10) as the glass plates 9 stand on edge and lean against the supporting wall 2. The common plane which is tangent to the tops of the rollers 8 constitutes the plane of conveyance of the bottom edge supporting conveyor. The supporting wall is formed in its forward surface 3 with a plurality of slots 11, which are spaced a small distance above the bottom edge of the supporting wall 2 and are arranged one behind the other in the direction of travel and extend in the direction of travel 10 parallel to the lower edge of the supporting wall and in an upwardly and forwardly inclined direction.

The distance from the bottom edge of the supporting wall 2 and the top of the rollers 8 is preferably not in excess of 10 cm, and the slots 11 in the forward surface 3 of the supporting wall are preferably spaced by not more than 7 cm above the lower edge of the supporting wall.

The supporting wall is formed in its forward surface 3 with a plurality of bores 12, which are spaced 100 to 120 cm above the rollers 8 and are preferably regularly spaced apart in a horizontal row and are forwardly and downwardly inclined. Above the row of bores 12, additional bores 13 and 14 are arranged in two rows. The bores 13 are forwardly and upwardly inclined and the bores 14 extend at right angles to the forward surface 3 of the supporting wall. The rows are suitably spaced 30 cm apart and the bores in each row may be spaced 20 to 25 cm apart. If the rollers 8 are spaced 50 cm above the floor, the rows of bores 12 and 13 will be approximately on the eye level of the operators. For this reason it is desirable for the lower bores 12 to be forwardly and downwardly inclined and for the upper bores 13 to be forwardly and upwardly inclined so that the air leaving said bores will not be blown into the face of the operators.

The slots 11 and the bores 12, 13 and 14 communicate with a cavity 4, which is formed in the supporting wall 2, and air can be blown into said cavity by a blower 15, and will leave the cavity 4 through the slots 11 and the bores 12, 13, 14.

A plurality of backing rollers 5, which are arranged in a horizontal row and mounted in fixed positions relative to the frame, are disposed between the bottom edge of the supporting wall 2 and the rollers 8. The backing rollers 5 are freely rotatable about an axis which is parallel to the forward surface 3 of the supporting wall and at right angles to the direction of conveyance 10. The arrangement of the backing rollers 5 is such that their peripheral surface arranged to contact the glass plates 9 being conveyed slightly protrudes—preferably by 2 to 5 mm—from the plane which is defined by the forward surface 3 of the supporting wall 2. As a result, the lower portion of each glass plate 9 will inherently be held at a small distance from the forward surface 3 of the supporting wall and an upwardly tapering gap will be formed between said lower portion of the glass plate 9 and the supporting wall. The air leaving the slots 11 can easily flow into said gap and can build up an air cushion which lifts each glass plate 9 throughout its area from the supporting wall 2.

The backing rollers 5 also ensure that the subatmospheric pressure generated between the glass plates and the supporting wall by the air leaving the slots will not urge the glass plates into contact with the supporting wall; such contact might result in a breaking of the glass plates.

Figure 3:
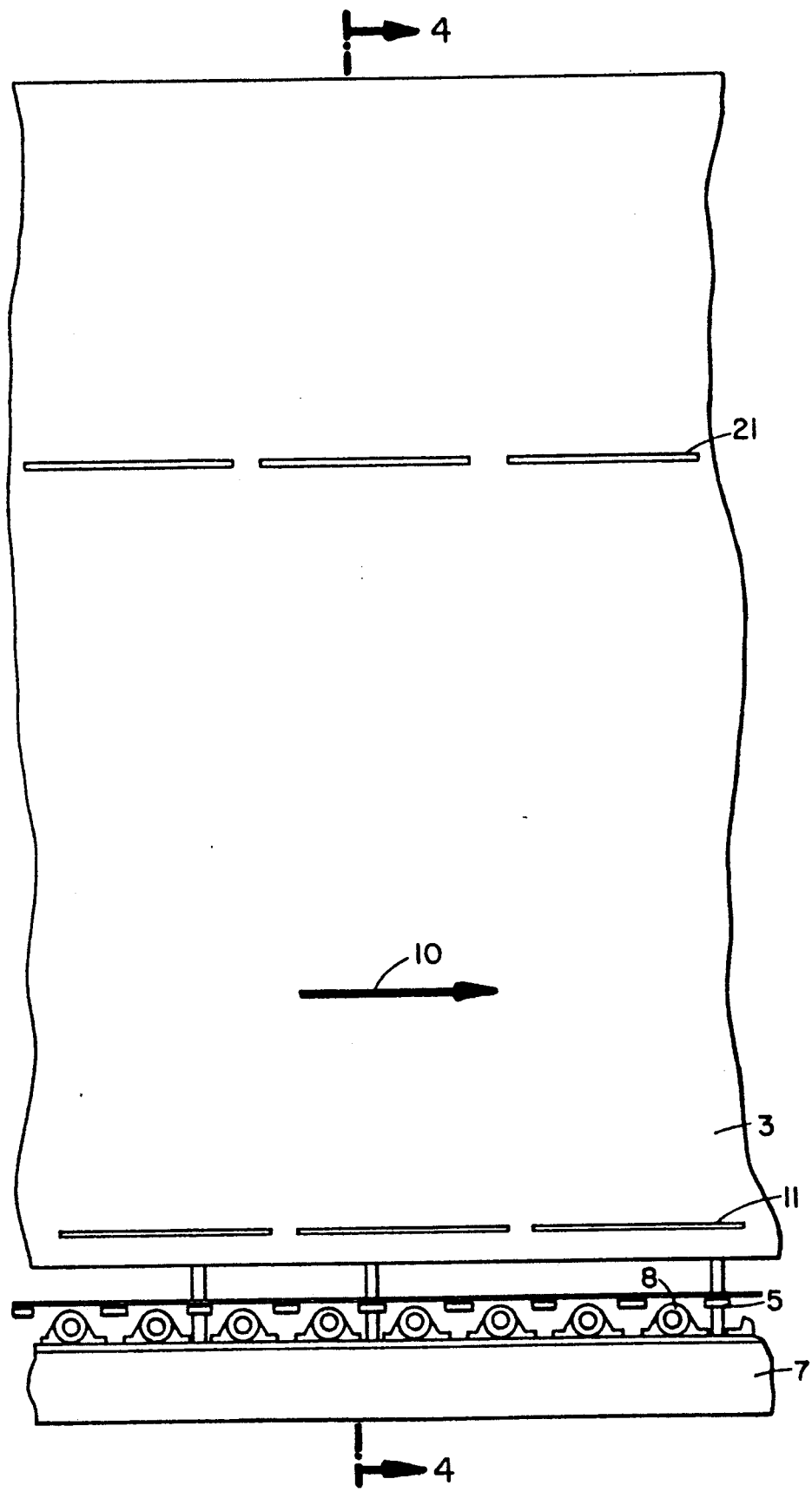
FIG. 3 is a front elevation of a second embodiment of the invention.
Figure 4:
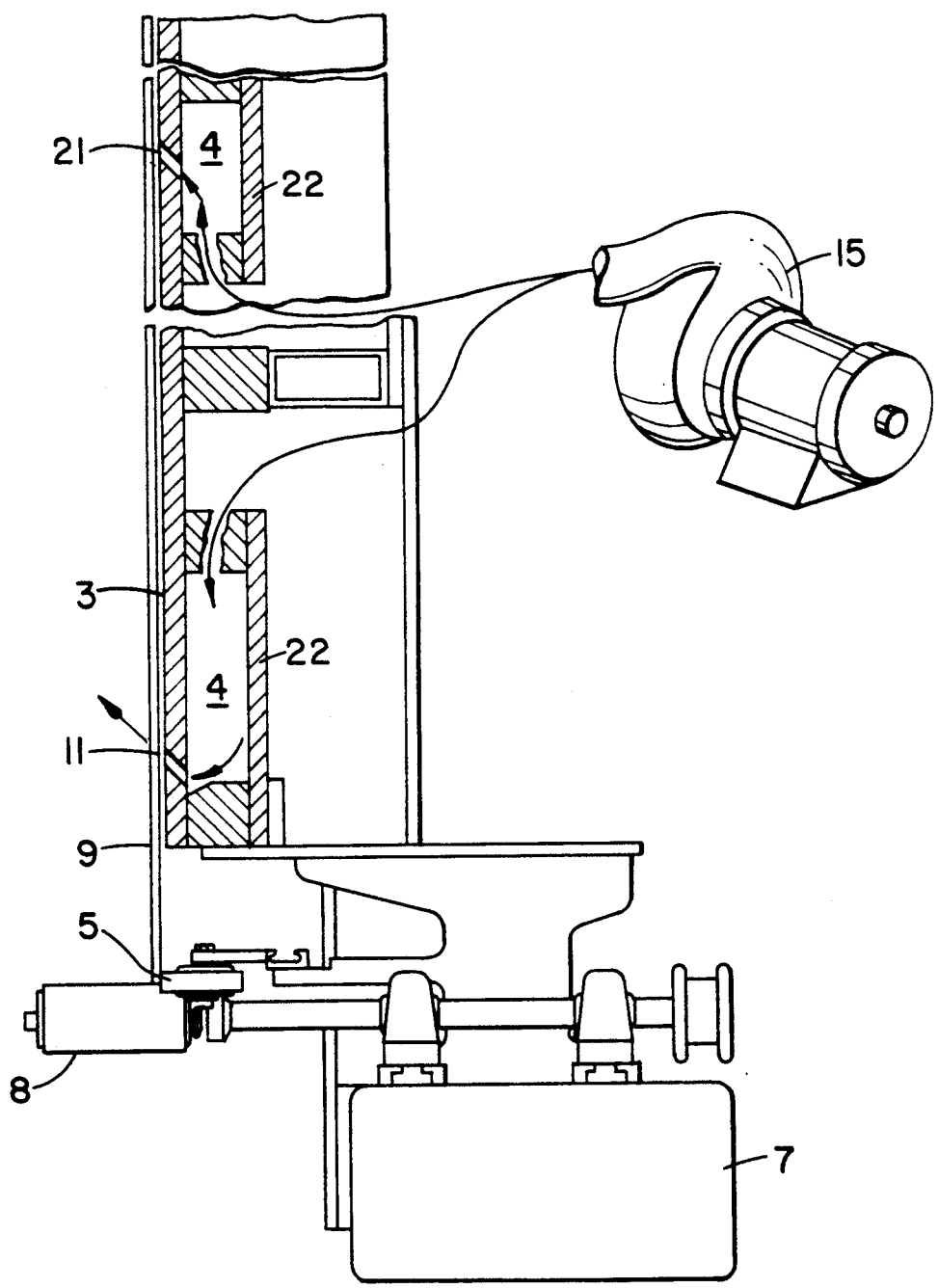
FIG. 4 is an enlarged vertical sectional view taken along line IV—IV in FIG. 3.

The FIG. 3 embodiment differs from the FIG. 1 embodiment in that the bores 12, 13 and 14 are replaced by a horizontal line of slots 21 which are disposed above a line of slots 11, at a level of at least 120 cm, preferably about 165 cm above the level of the supporting rollers 8. Like the lower slots 11, the upper slots 21 are forwardly and upwardly inclined to direct flow of air along a path indicated by arrows. Replacement of the different bores by a second line of slots 21 simplifies the construction of wall 3. The slots 11, 21 can be cut through the wall from the front to the rear side and can be covered on the rear side by a detachable member enabling an easy cleaning of the slots.

We claim:

1. In apparatus for horizontally conveying glass plates standing on edge, comprising
   a bottom edge supporting conveyor having forward and rear sides and defining a substantially horizontal plane of conveyance and adapted to support at least one glass plate standing on edge on said plane of conveyance, which conveyor is operable to move said at least one glass plate along said conveyor in a horizontal direction of travel, and
   a substantially vertical supporting wall, which extends along said conveyor on said rear side thereof and substantially at right angles to said plane of conveyance and has a planar forward surface and a rear side and is upwardly and rearwardly inclined and has a horizontal bottom edge spaced above said plane of conveyance, said supporting wall being adapted to laterally support at least one glass plate standing on edge on said conveyor and leaning against said supporting wall, wherein
   at least one slotlike air exit opening is provided, which extends along said bottom edge adjacent to the same and is forwardly and upwardly inclined,
   a fan is provided, and
   at least one air duct is arranged to deliver air from said fan to said at least one air exit opening from the rear thereof so that said air exiting from said at least one air exit opening is adapted to form at least one air cushion between said forward surface of said supporting wall and at least one glass plate standing on edge on said conveyor and leaning against said supporting wall,
   the improvement residing in that
   said at least one air exit opening consists of at least one slot formed in said supporting wall and opening in said forward surface of said supporting wall and being forwardly and upwardly inclined relative to said forward surface, wherein
   the bottom edge of the supporting wall is placed about 10 cm above the plane of conveyance and the at least one slot is spaced 5 to 10 cm above said bottom edge.

2. The improvement set forth in claim 1, wherein said supporting wall is formed with additional air exit openings, which are spaced not less than 80 centimeters from said bottom edge.

3. The improvement set forth in claim 2 as applied to apparatus standing on the floor, wherein
   said additional air exit openings comprise eye level exit openings disposed approximately on the eye level of an operator standing in front of the apparatus and
   said eye level exit openings are arranged in at least one lower row of forwardly and downwardly inclined openings and at least one upper row of forwardly and upwardly inclined openings.

4. The improvement set forth in claim 2, wherein said additional air exit openings comprise openings which are spaced not less than 100 to 120 centimeters from said bottom edge.

5. The apparatus according to claim 1, further comprising at least one supplemental slot formed in said supporting wall being forwardly and upwardly inclined relative to the forward surface of said supporting wall and having an opening in said forward surface of said supporting wall at a level of not less than 120 cm above the plane of conveyance.

6. Apparatus according to claim 5, wherein said opening in said forward surface of said supporting wall is about 160 to 170 cm above the plane of conveyance.

7. In apparatus for horizontally conveying glass plates standing on edge, comprising
   a bottom edge supporting conveyor having forward and rear sides and defining a substantially horizontal plane of conveyance and adapted to support at least one glass plate standing on edge on said plane of conveyance, which conveyor is operable to move said at least one glass plate along said conveyor in a horizontal direction of travel, and
   a substantially vertical supporting wall, which extends along said conveyor on said rear side thereof and substantially at right angles to said plane of conveyance and has a planar forward surface and a rear side and is upwardly and rearwardly inclined and has a horizontal bottom edge spaced above said plane of conveyance, said supporting wall being adapted to laterally support at least one glass plate standing on edge on said conveyor and leaning against said supporting wall, wherein at least one slotlike air exit opening is provided, which extends along said bottom edge adjacent to the same and is forwardly and upwardly inclined, a fan is provided, and at least one air duct is arranged to deliver air from said fan to said at least one air exit opening from the rear thereof so that said air exiting from said at least one air exit opening is adapted to form at least one air cushion between said forward surface of said supporting wall and at least one glass plate standing on edge on said conveyor and leaning against said supporting wall, the improvement residing in that said at least one air exit opening consists of at least one forwardly and upwardly inclined slot formed in said supporting wall and opening in said forward surface of said supporting wall and being forwardly and upwardly inclined relative to said forward surface, a plurality of backing rollers are provided on the rear side of said conveyor above said plane of conveyance and below said bottom edge and are spaced along said conveyor and mounted for rotation about an axis which is at right angles to said direction of travel and parallel to said supporting wall, and each of said backing rollers has a peripheral surface which protrudes from said forward surface of said supporting wall, wherein the bottom edge of the supporting wall is placed about 10 cm above the plane of conveyance and the at least one slot is spaced 5 to 10 cm above said bottom edge.

8. The improvement set forth in claim 7, wherein said at least one slot includes an angle between 40 and 60 degrees with said forward surface of said supporting wall.

9. The improvement set forth in claim 7, wherein said supporting wall is formed with additional air exit openings, which are spaced not less than 80 centimeters from said bottom edge.

10. In apparatus for horizontally conveying glass plates standing on edge, comprising a bottom edge supporting conveyor having forward and rear sides and defining a substantially horizontal plane of conveyance and adapted to support at least one glass plate standing on edge on said plane of conveyance, which conveyor is operable to move said at least one glass plate along said conveyor in a horizontal direction of travel, and a substantially vertical supporting wall, which extends along said conveyor on said rear side thereof and substantially at right angles to said plane of conveyance and has a forward surface and a rear side and is upwardly and rearwardly inclined and has a horizontal bottom edge spaced above said plane of conveyance, said supporting wall being adapted to laterally support at least one glass plate standing on edge on said conveyor and leaning against said supporting wall, wherein at least one slotlike air exit opening is provided, which extends along said bottom edge adjacent to the same and is forwardly and upwardly inclined, a fan is provided, and at least one air duct is arranged to deliver air from said fan to said at least one air exit opening from the rear thereof so that said air exiting from said at least one air exit opening is adapted to form at least one air cushion between said forward surface of said supporting wall and at least one glass plate standing on edge on said conveyor and leaning against said supporting wall, the improvement residing in that said at least one air exit opening consists of at least one forwardly and upwardly inclined slot formed in said supporting wall and opening in said forward surface of said supporting wall, wherein said supporting wall is formed with additional air exit openings, which are spaced not less than 80 centimeters from said bottom edge, said additional air exit openings comprise eye level exit openings disposed approximately on the eye level of an operator standing in front of the apparatus, and said eye level exit openings are arranged in at least one lower row of forwardly and downwardly inclined openings and at least one upper row of forwardly and upwardly inclined openings.

11. In apparatus for horizontally conveying glass plates standing on edge, comprising a bottom edge supporting conveyor having forward and rear sides and defining a substantially horizontal plane of conveyance and adapted to support at least one glass plate standing on edge on said plane of conveyance, which conveyor is operable to move said at least one glass plate along said conveyor in a horizontal direction of travel, and a substantially vertical supporting wall, which extends along said conveyor on said rear side thereof and substantially at right angles to said plane of conveyance and has a planar forward surface and a rear side and is upwardly and rearwardly inclined and has a horizontal bottom edge spaced above said plane of conveyance, said supporting wall being adapted to laterally support at least one glass plate standing on edge on said conveyor and leaning against said supporting wall, wherein at least one slotlike air exit opening is provided, which extends along said bottom edge adjacent to the same and is forwardly and upwardly inclined, a fan is provided, and at least one air duct is arranged to deliver air from said fan to said at least one air exit opening from the rear thereof so that said air exiting from said at least one air exit opening is adapted to form at least one air cushion between said forward surface of said supporting wall and at least one glass plate standing on edge on said conveyor and leaning against said supporting wall, the improvement residing in that said at least one air exit opening consists of at least one forwardly and upwardly inclined slot formed in said supporting wall and opening in said forward surface of said supporting wall and being forwardly and upwardly inclined relative to said forward surface, wherein the bottom edge of the supporting wall is placed about 10 cm above the plane of conveyance and the at least one slot is spaced 5 to 10 cm above said bottom edge, said supporting wall being formed with additional air exit openings, which are spaced not less than 80 centimeters from said bottom edge.

12. In apparatus for horizontally conveying glass plates standing on edge, comprising
- a bottom edge supporting conveyor having forward and rear sides and defining a substantially horizontal plane of conveyance and adapted to support at least one glass plate standing on edge on said plane of conveyance, which conveyor is operable to move said at least one glass plate along said conveyor in a horizontal direction of travel, and
- a substantially vertical supporting wall, which extends along said conveyor on said rear side thereof and substantially at right angles to said plane of conveyance and has a planar forward surface and a rear side and is upwardly and rearwardly inclined and has a horizontal bottom edge spaced above said plane of conveyance, said supporting wall being adapted to laterally support at least one glass plate standing on edge on said conveyor and leaning against said supporting wall, wherein
- at least one slotlike air exit opening is provided, which extends along said bottom edge adjacent to the same and is forwardly and upwardly inclined,
- a fan is provided, and
- at least one air duct is arranged to deliver air from said fan to said at least one air exit opening from the rear thereof so that said air exiting from said at least one air exit opening is adapted to form at least one air cushion between said forward surface of said supporting wall and at least one glass plate standing on edge on said conveyor and leaning against said supporting wall, the improvement residing in that said at least one air exit opening consists of at least one forwardly and upwardly inclined slot formed in said supporting wall and opening in said forward surface of said supporting wall, a plurality of backing rollers are provided on the rear side of said conveyor above said plane of conveyance and below said bottom edge and are spaced along said conveyor and mounted for rotation about an axis which is at right angles to said direction of travel and parallel to said supporting wall, and each of said backing rollers has a peripheral surface which protrudes from said forward surface of said supporting wall, wherein the bottom edge of the supporting wall is placed about 10 cm above the plane of conveyance and the at least one slot is spaced 5 to 10 cm above said bottom edge, and said at least one slot includes an angle between 40 and 60 degrees with said forward surface of said supporting wall.

* * * * *